Nov. 27, 1934.　　　K. L. CURTIS　　　1,982,201
PROJECTION APPARATUS AND/OR SYSTEM
Filed May 23, 1930　　　8 Sheets-Sheet 1
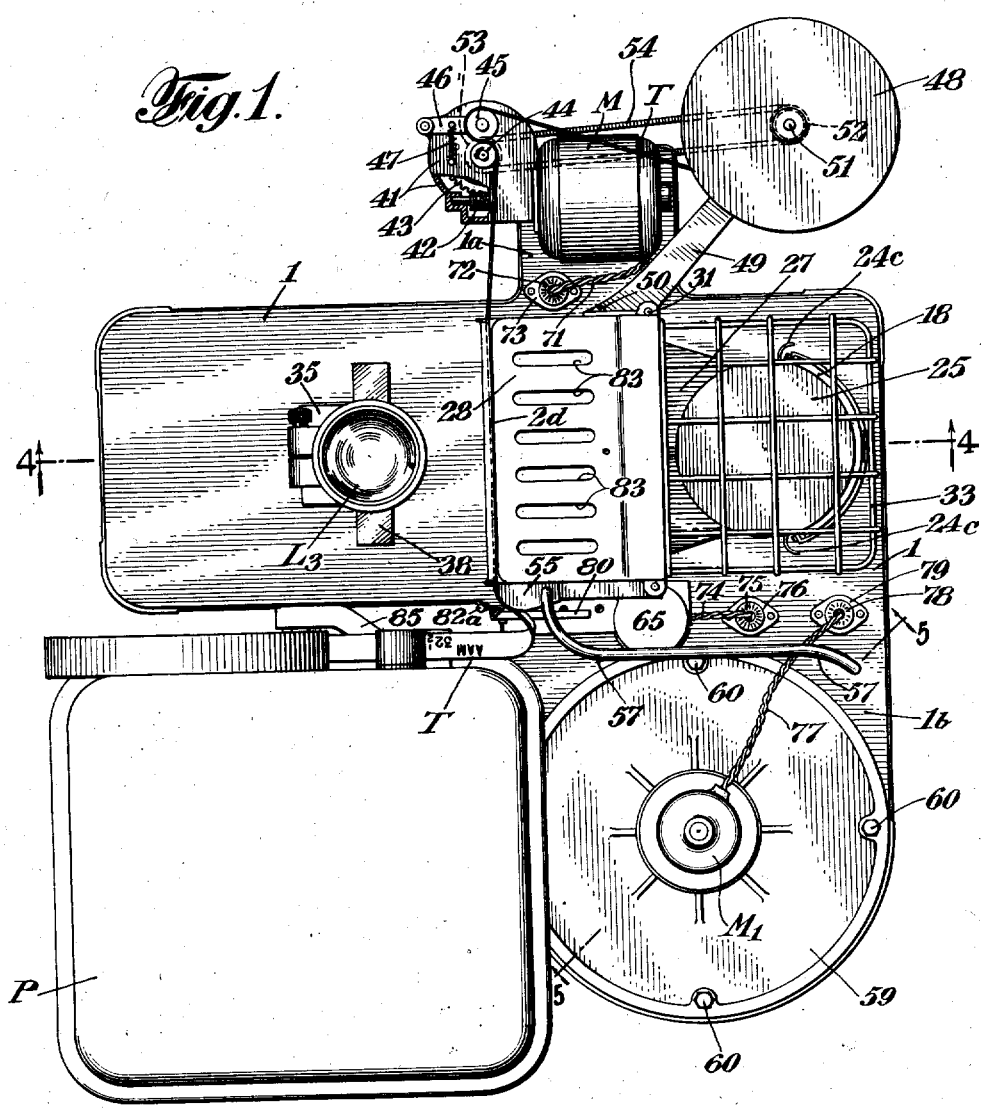
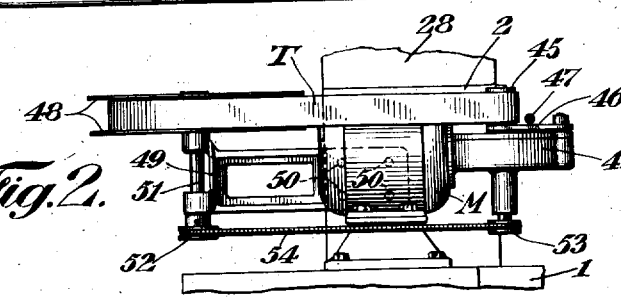
INVENTOR
Kenneth L. Curtis
BY
Ward, Crosby & Neal
ATTORNEYS

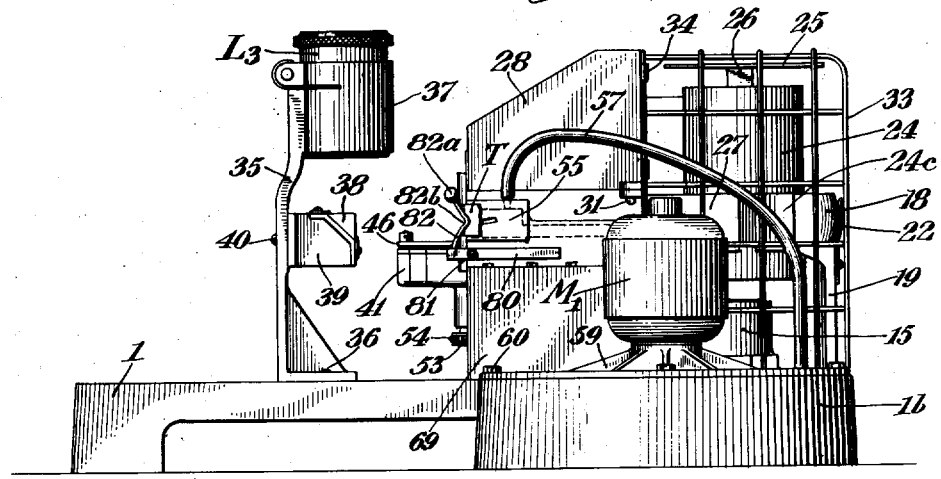
Fig. 3.
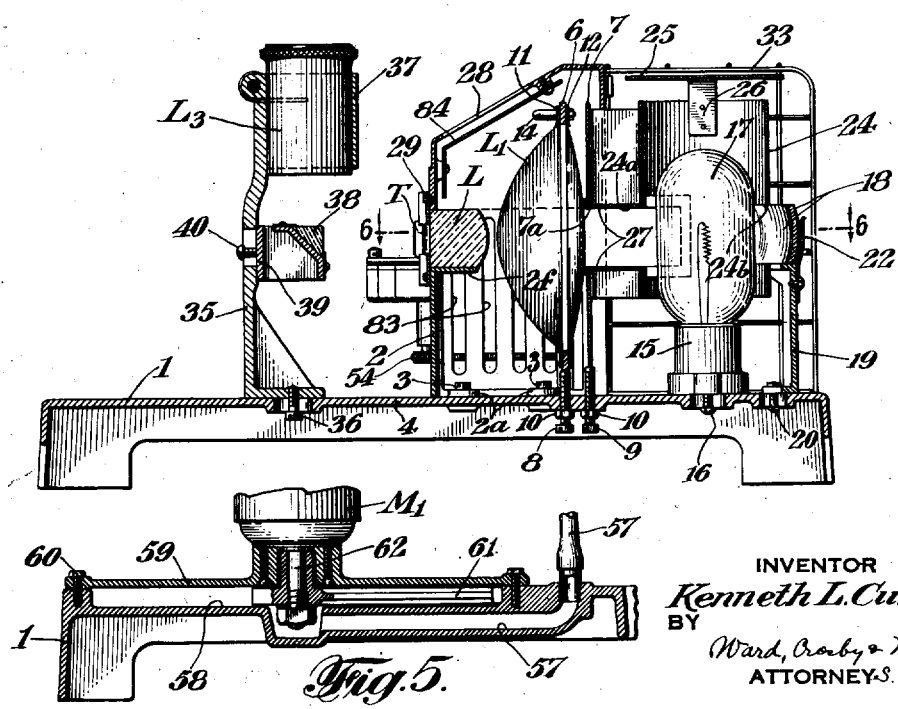
Fig. 4.
Fig. 5.
INVENTOR
Kenneth L. Curtis
BY
Ward, Crosby & Neal
ATTORNEYS.

Nov. 27, 1934.  K. L. CURTIS  1,982,201
PROJECTION APPARATUS AND/OR SYSTEM
Filed May 23, 1930  8 Sheets—Sheet 3
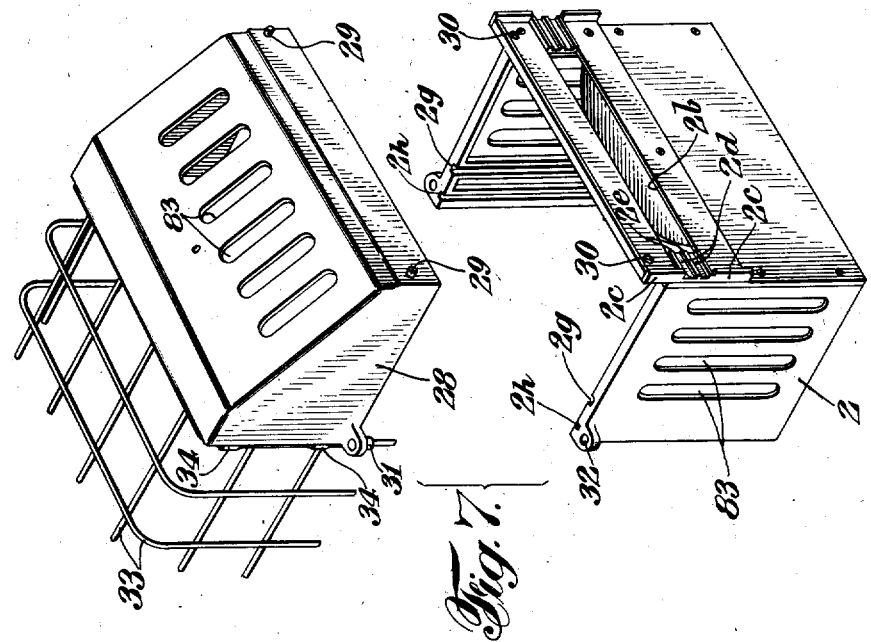
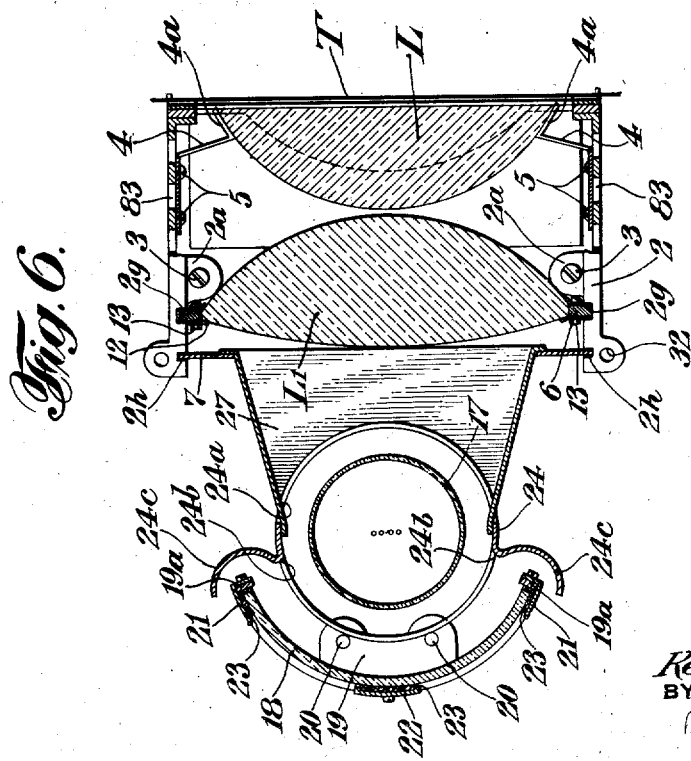
INVENTOR
Kenneth L. Curtis
BY
Ward, Crosby & Neal
ATTORNEYS Nov. 27, 1934.    K. L. CURTIS    1,982,201
PROJECTION APPARATUS AND/OR SYSTEM
Filed May 23, 1930    8 Sheets-Sheet 4

INVENTOR
Kenneth L. Curtis
BY
Ward, Crosby & Neal
ATTORNEYS

Nov. 27, 1934.   K. L. CURTIS   1,982,201
PROJECTION APPARATUS AND/OR SYSTEM
Filed May 23, 1930   8 Sheets-Sheet 5
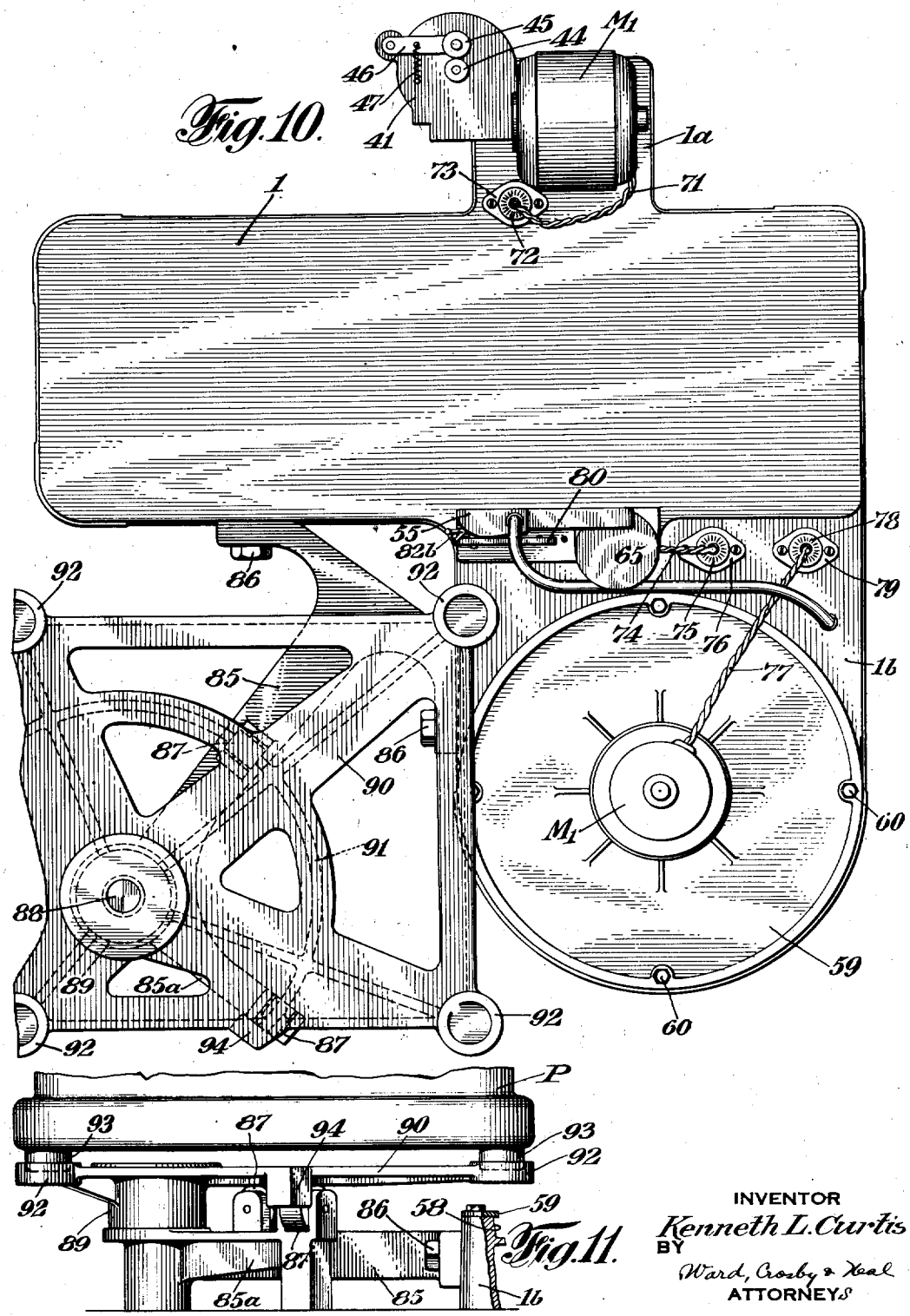
INVENTOR
Kenneth L. Curtis
BY
Ward, Crosby & Neal
ATTORNEYS

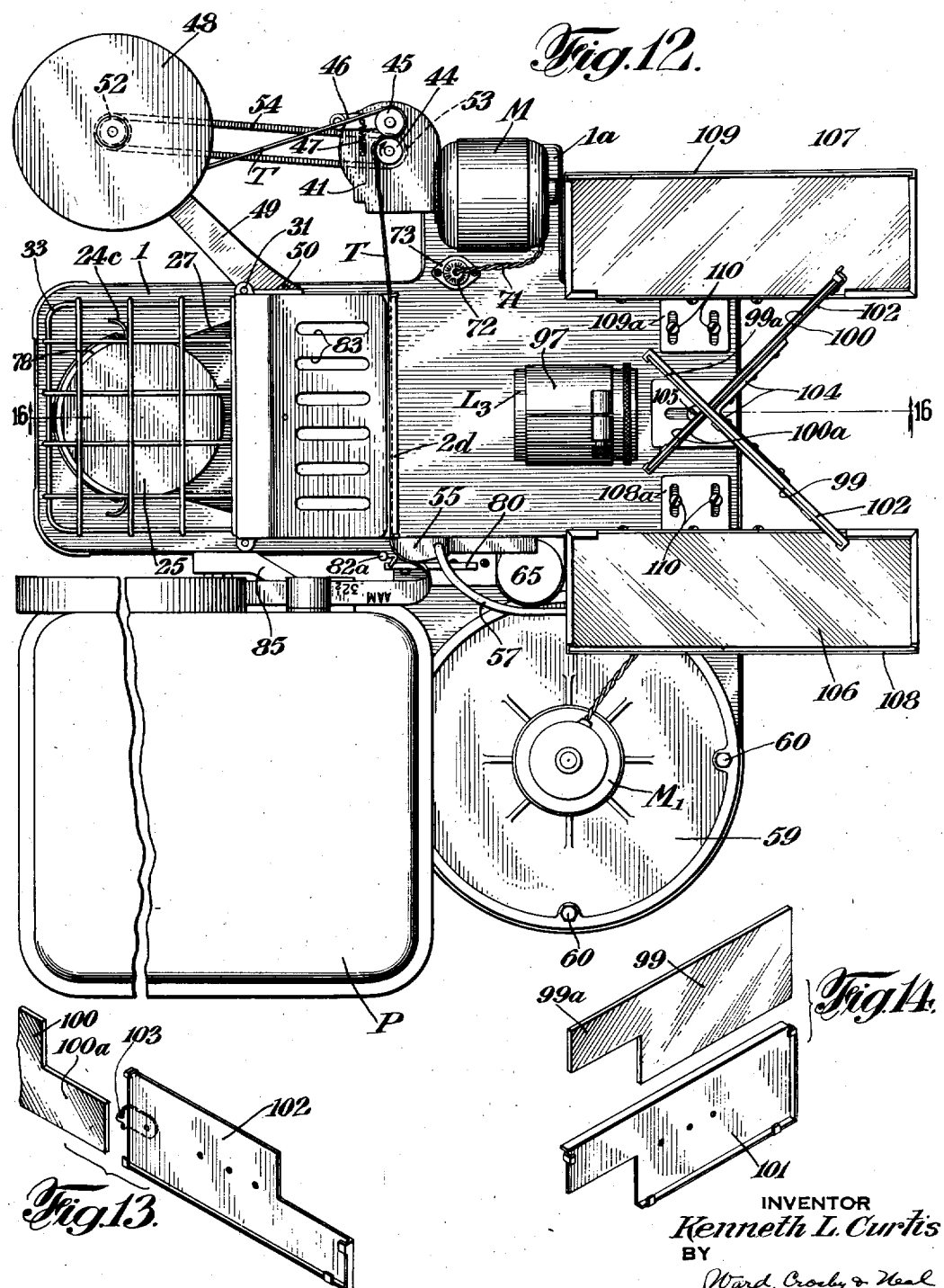

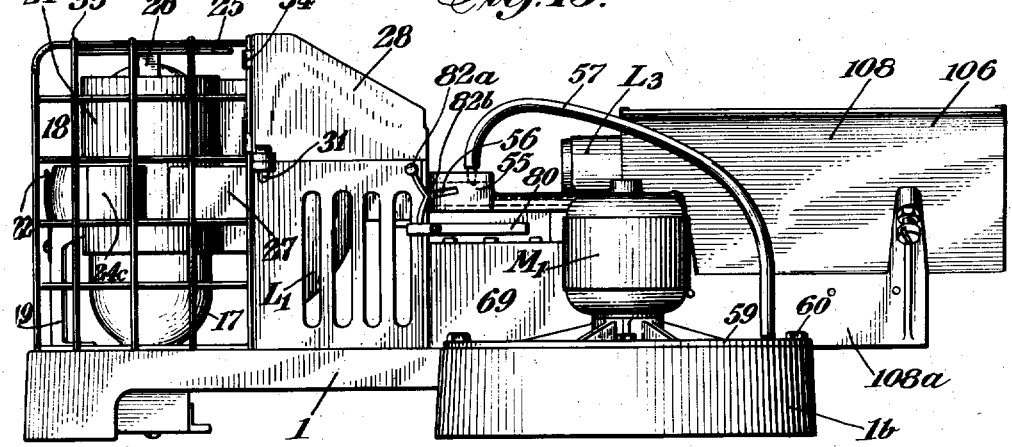
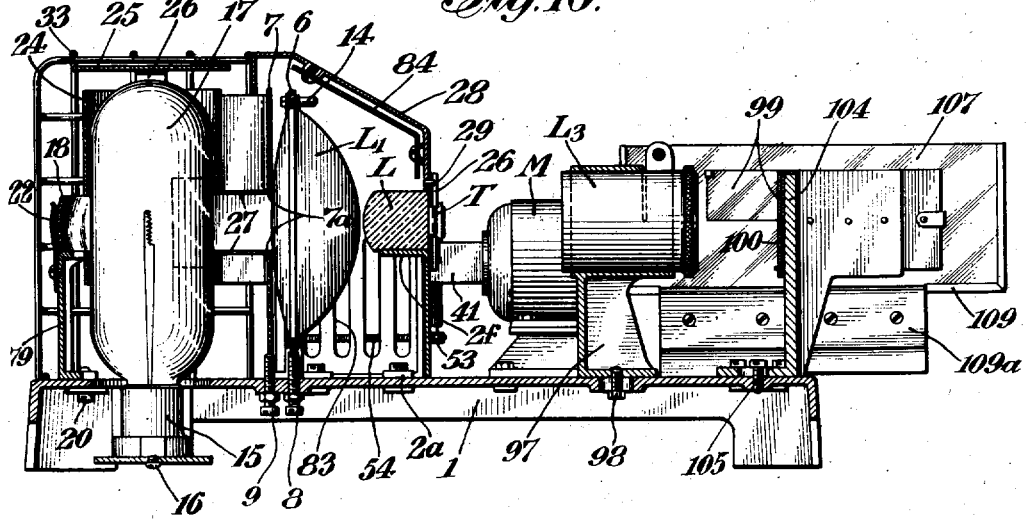

Nov. 27, 1934.  K. L. CURTIS  1,982,201
PROJECTION APPARATUS AND/OR SYSTEM
Filed May 23, 1930   8 Sheets-Sheet 8
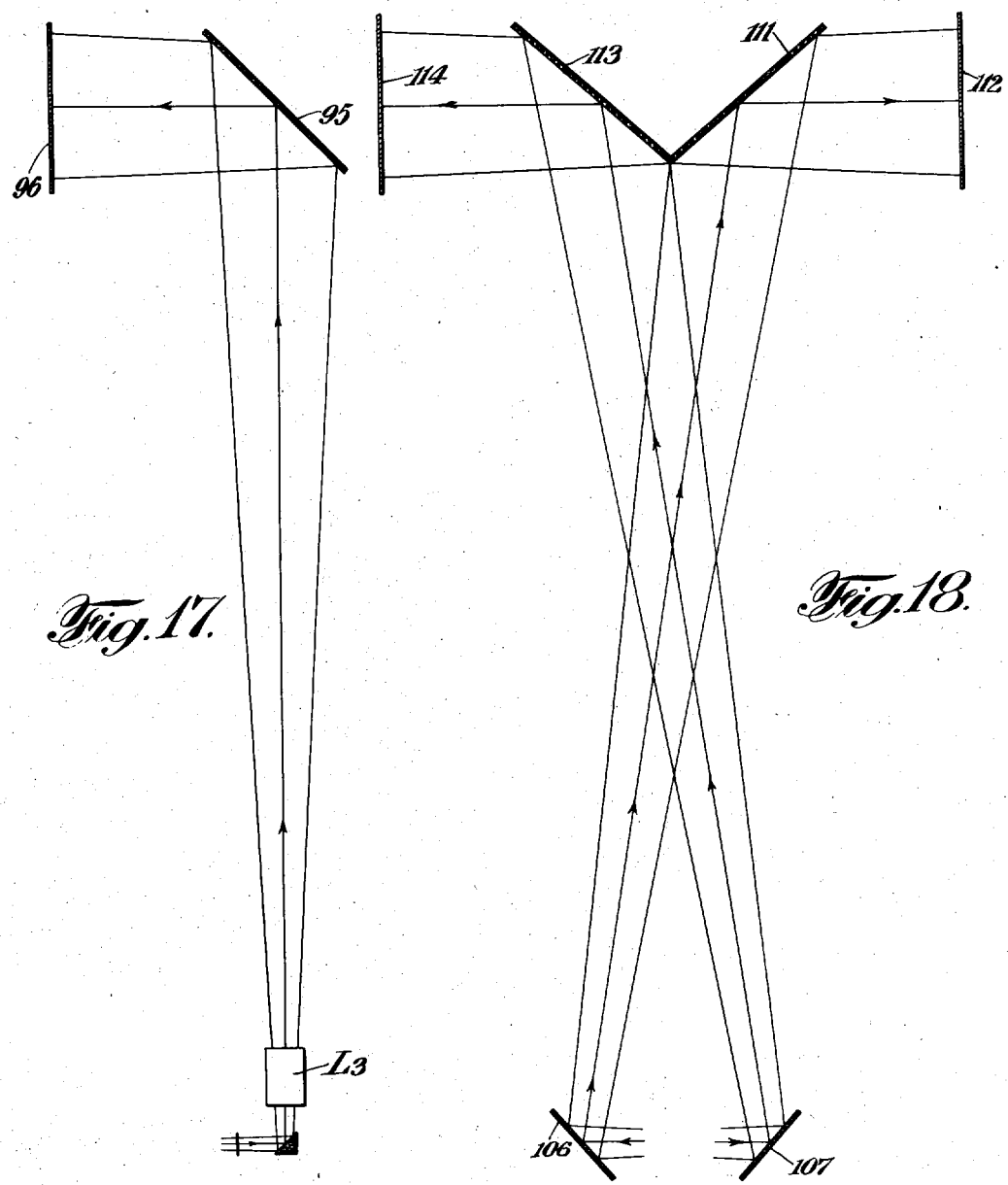
INVENTOR
Kenneth L. Curtis
BY
Ward, Crosby & Neal
ATTORNEYS Patented Nov. 27, 1934

1,982,201

UNITED STATES PATENT OFFICE 1,982,201

PROJECTION APPARATUS AND/OR SYSTEM

Kenneth L. Curtis, New York, N. Y., assignor to Trans-Lux Daylight Picture Screen Corporation, New York, N. Y., a corporation of Delaware Application May 23, 1930, Serial No. 454,896

4 Claims. (Cl. 88—24)

My invention relates to projection apparatus and to a projection system utilizable for obtaining images of characters borne by a tape or the like.

My invention, in one prominent phase thereof, relates to projection apparatus including parts grouped in a simple and highly practical manner.

My invention relates to a projecting device highly satisfactory for the intended purpose and including a less number of parts of simple design than do prior devices utilizable for the same purpose.

My invention also relates to projection systems of novel and highly efficient character.

Further objects, advantages and characteristics of my invention will become apparent from the following detailed description taken in connection with the accompanying drawings.

My invention resides in the projection apparatus, projection system, arrangements of parts, and features of construction of the character hereinafter described and claimed.

For an understanding of my invention and for an illustration of some of the many forms thereof, reference is to be had to the accompanying drawings, in which:

Figure 1 is a plan view of projection apparatus as constructed in accordance with my invention;

Fig. 2 is a side elevational view, partly broken away, of the tape feeding arrangement shown in Fig. 1;

Fig. 3 is a side elevational view of the projection apparatus shown in Fig. 1;

Fig. 4 is a vertical sectional view, partly in elevation, and is taken on the line 4—4 of Fig. 1 looking in the direction of the arrows;

Fig. 5 is a vertical sectional view, partly in elevation, and is taken on the line 5—5 of Fig. 1 looking in the direction of the arrows;

Fig. 6 is a horizontal sectional view, partly in plan, and is taken on the line 6—6 of Fig. 4;

Fig. 7 is a perspective view showing certain housing parts in disassociated relation;

Fig. 10 is a plan view showing the base of my projection apparatus and some of the parts carried thereby;

Fig. 11 is a side elevational view of part of the mechanism shown in Fig. 10;

Fig. 12 is a plan view of another form of projection apparatus as constructed in accordance with my invention;

Figs. 13 and 14 are perspective views showing mirrors and their supports in disassociated relation;

Fig. 15 is a side elevational view of the mechanism shown in Fig. 12;

Fig. 16 is a vertical sectional view, partly in elevation, and is taken on the line 16—16 of Fig. 12;

Fig. 17 is a side elevational view of a light-reflecting system and an associated screen utilizable with the projection apparatus of Figs. 1–11 inclusive; and Fig. 18 is a side elevational view of a projection system including a plurality of screens and is utilizable in connection with the projection apparatus of Figs. 12–16 inclusive.

Figure 9:
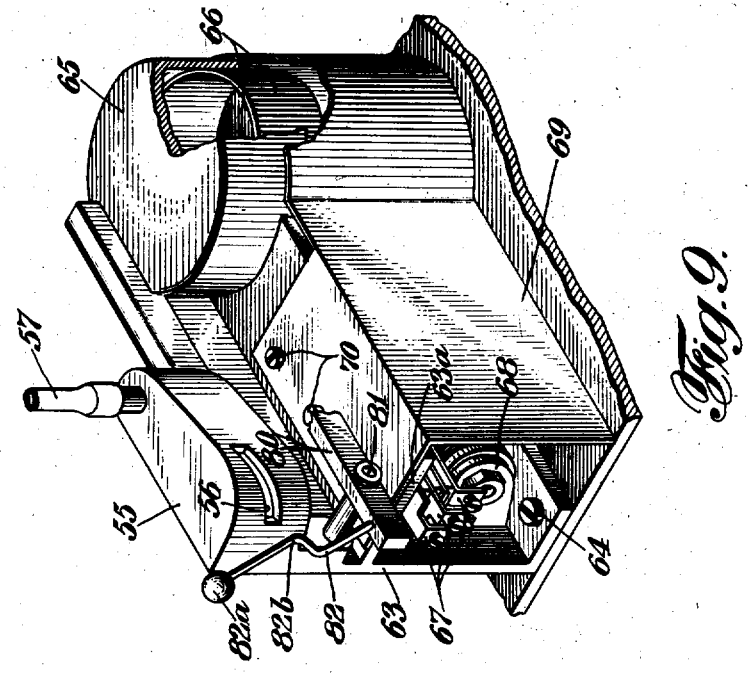
Fig. 9 is a perspective view, partly broken away, of a part of the mechanism as constructed in accordance with my invention.

In Figs. 1–11 inclusive herein, I have shown a form of projection apparatus arranged for obtaining on a suitable screen a single image of each character borne by a tape or the like. However, as will be pointed out in connection with Figs. 12–16 inclusive, such projection apparatus is also utilizable in a highly satisfactory manner for obtaining an image of each of the aforesaid characters on each of a plurality of screens.

Referring first to Figs. 1–11 inclusive, 1 represents a suitable base or support adapted to support projecting apparatus or mechanism constructed and arranged in accordance with my invention.

As illustrative of one of the many suitable forms of such apparatus, the base 1 is shown as having a lens housing or casing 2 upstanding therefrom, the housing and base being suitably secured together, as by screws 3 which extend through lower lugs 2a of the housing 2 and are threaded into said base. In the form of my invention herein shown, the lens housing 2 per se comprises only front and side walls, and, therefore, is open at the top and rear except when closed as hereinafter described.

The front wall of the lens housing 2 has an upwardly extending plate formed either integrally therewith or, preferably, separate as shown, this plate having an elongated aperture or passage 2b, Fig. 7, along or with respect to which a tape T is adapted to travel as hereinafter more fully described. To the end that said tape may properly be guided in its movement, the aforesaid plate may be provided, at each end thereof, with a flange 2c, each of which is provided with a recess or slot, said recesses being disposed in alinement with each other and with the aperture 2b, Fig. 7.

Preferably, the aperture 2b does not extend the full length of the front housing wall and, therefore, at each end of said aperture, there is a front plate section 2d with which the tape T would engage entirely were it not for the provision of spaced ribs 2e, the latter preferably being provided for a reason hereinafter to be stated.

Disposed interiorly of the lens housing 2 immediately adjacent the front wall thereof and in alinement with the aperture 2b is a suitable condensing lens L which, in the example shown but not necessarily, rests upon a ledge or flange 2f formed preferably integrally with the housing front wall, Fig. 4. The lens L may be detachably retained on the flange 2f in any suitable manner as, for example, by members 4 retained, if desired, to the respective housing side walls by screws 5, each member 4 having one or more resilient prong sections 4a which engage the lens L at the respective opposite ends thereof, Fig. 6.

In accordance with one form of my invention and as shown in Figs. 6 and 7, opposite side walls of the lens housing 1 are interiorly formed with sets of slots or passages 2g and 2h all of which, in the example shown, extend vertically, the slots 2g being disposed in alinement with each other and the slots 2h being similarly disposed.

Freely slidable in the slots 2g is a plate-like member 6 and slidable in similar manner in the slots 2h is a plate-like member 7. The member 6 carries a condensing lens L1 whereas the member 7 is utilizable as hereinafter described. In accordance with my invention, a suitable arrangement may be employed for obtaining adjustment in height of the members 6 and 7, and, as shown in Fig. 4, one or more screws 8 are threaded vertically through the base 1 above which they extend and upon which the member 6 rests. Similarly, one or more screws 9 are coactable with the lower surface of the member 7, the screws 8 and 9 being releasably retained in adjusted positions, if desired, by lock nuts 10. Obviously, the members 8 and 9 may be adjusted in height in response to threading or unthreading of the screws 8 and 9, the nuts 10 retaining the latter in their respective adjusted positions.

The member 6 is ring-shaped and forms an aperture having a diameter substantially the same as that of the lens L1 and, in this aperture, said lens L1 is secured by any suitable arrangement. To this end and as herein shown, sheet-like, ring members 11 and 12 are utilized, said members 11 and 12 having apertures somewhat smaller in diameter than that of the lens L1 and being disposed on opposite sides of the plate 6 so that they engage said lens on opposite faces thereof, suitable soft packing material, not shown, being disposed, if desired, between the otherwise contacting surfaces of the members 11 and 12, and the lens L1. As illustrated, the ring members 11 and 12 may be secured in clamping relation to the member 6 by lower bolts 13 and upper bolts 14, the latter preferably having elongated sections, Fig. 4, covered with heat-insulating material so that they may be grasped and elevated when it is desired to remove the member 6 and lens L1 from the housing 2.

In accordance with the form of my invention herein disclosed, the base 1 carries a suitable upstanding lamp socket 15 which may be secured to said base in any suitable manner, as by the screw 16, extending preferably through an elongated base slot whereby the socket 15 may readily be moved either toward or from the lens L1 and detachably retained in a position to which moved.

Associated with the socket 15 is any suitable source of light 17 which, as shown, is an electric lamp of suitable rating whereby a beam of light for projection purposes is caused to traverse the lenses L1 and L.

Preferably, a suitable arc-shaped light-reflecting member 18 is disposed at the side of the lamp 17 opposite the lens L1 whereby the intensity of the projecting light beam is increased. As herein shown, the light-reflecting member 18 is carried by a standard 19 which may be secured to the upper surface of the base 1 by one or more screws 20, Figs. 4 and 6, said screws, preferably, extending through elongated slots as shown in Fig. 4 whereby said standard 19 together with the thereby carried member 18 may be moved toward or from the lamp 17 and detachably retained in a position to which moved.

By preference, the light-reflecting member 18 is readily detachable from the standard 19 and, with this end in view, there may be utilized a plurality of resilient backing clips 21, Fig. 6, carried by the respective upstanding end sections 19a of the standard 19, a resilient clip 22 disposed substantially centrally of the standard 19 also being utilized if desired. As shown particularly in Fig. 6, all of said clips resiliently engage the rear face of the light-reflecting member 18 preferably through the interposed respective layers 23 of asbestos, felt or the like and, by said clips, the light-reflecting member 18 is biased from left to right, Fig. 6, to the extent permitted by the standard end sections 19a. However, as will be obvious, said light-reflecting member 18 may readily be removed from the standard 19 by elevating the same in a direction generally at right angles to the plane of the paper as viewed in Fig. 6. Further, in as simple a manner, the light-reflecting member 18 may readily be returned to operative position on the standard 19.

In accordance with my invention, a suitable housing is associated with the lamp 17 and as herein shown, but not necessarily, this lamp housing is carried by the aforesaid plate-like member 7 which, in effect, forms the rear wall of the lens housing 2 with respect to which said member 7 is detachably related as hereinbefore described.

Figure 8:
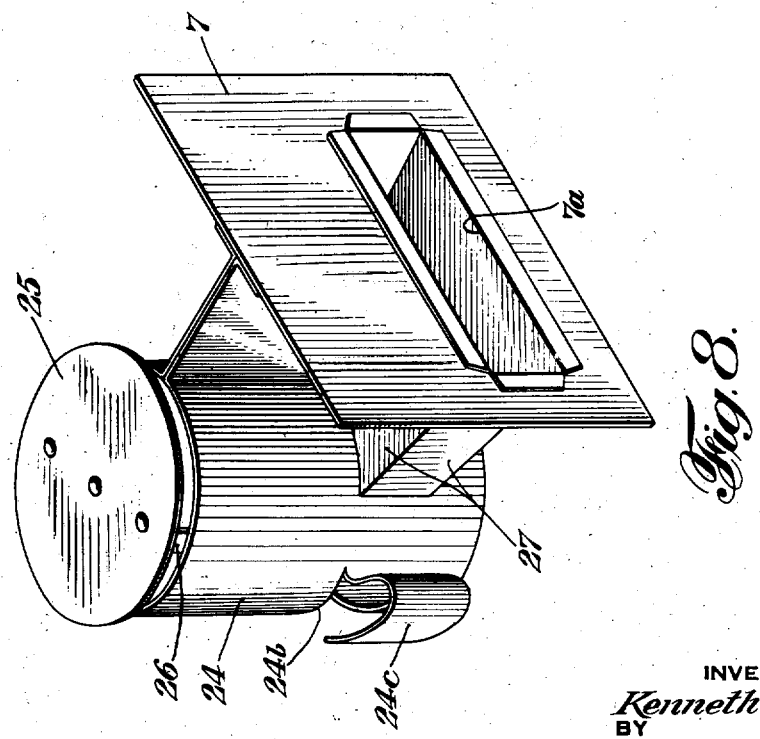
Fig. 8 is a perspective view of a lamp housing.

Referring particularly to Figs. 4, 6 and 8, the lamp housing is shown as comprising a hollow cylindrical member 24 somewhat greater in diameter than that of the lamp 17. Preferably, the member 24 is entirely open at the bottom. However, it is desirable that a plate-like member 25 be spaced above the top thereof whereby a passage of ample area is provided for the escape of heated air. As shown, the member 25 is secured to a plurality of connecting members 26 which in turn are secured to the cylindrical member 24.

The plate-like member 7 is provided with an elongated aperture 7a which normally comes into horizontal alinement with respect to the lens L. Similarly, the cylindrical member 24 is provided with an elongated aperture 24a disposed in horizontal alinement with respect to the aperture 7a of the plate-like member 7, Fig. 4. The apertures 7a and 24a are connected by a passage or channel-forming structure 27 which flares or diverges in a direction from right to left, Fig. 4, and is constituted by members forming top and bottom walls connected together by diverging side walls. These walls which form the aforesaid passage or channels are riveted or otherwise suitably secured to the plate-like member 7 and to the cylindrical member 24 whereby all of these parts are securely fastened together and, usually, all of them are formed of sheet metal.

The cylindrical member 24 comprises a second elongated aperture 24b disposed in horizontal alinement with respect to the aperture 24a and also with respect to the light-reflecting member 18. Preferably, the aperture 24b is formed by displacing sections 24c, 24c of the member 24 and, as shown particularly in Fig. 6, said sections 24c may be of such configuration that they define the sides of a passage between the light-reflecting member 18 and the aperture 24b.

As hereinbefore stated, the lens housing 2 per se is open at the top. In accordance with one form of my invention, said housing 2 is covered or closed by an upper housing 28 which may be pivoted thereto but as herein shown is readily detachable from said housing 2. The upper housing 28 per se is open at the bottom but has side walls, a front wall, a top wall which may be inclined as illustrated and, preferably, a depending rear wall which extends to about the top of the plate-like member 7 when the parts are in normal position, Fig. 4. The upper housing 28 is adapted to rest upon the housing 2 and, when the two housings are properly related, the respective side walls of the two housings should be substantially flush and even.

Any suitable arrangement may be utilized for detachably retaining the housing 28 on the housing 2. As herein shown, for example, there is thus utilized a pin-and-perforation arrangement, the front wall of the housing 28 having one or more pins 29 projecting therefrom and adapted to be received, respectively, in perforations 30 provided in the aforesaid plate having the aperture 2b. Similarly, each side wall of the upper housing 28 may have a flanged section carrying a depending pin 31, each pin 31 being adapted to enter a perforation 32 formed in a flanged section of the housing 2, Fig. 8. Accordingly, with the arrangement shown, the upper housing 28 is securely retained on the housing 2 by virtue of the described pin-and-perforation arrangement. At the same time, the housing 28 is readily detachable from the housing 2, it being only necessary to first elevate the rear thereof to disengage the pins 31 from the perforations 32 whereupon said housing 28 may be moved slightly to the rear to disengage the pins 29 from the perforations 30. When this has been accomplished, the housing 28 may be detached entirely from the housing 2. To reassemble the housings, the reverse action takes place, the pins 29 being inserted first in the respective perforations 30 whereupon the pins 31 drop into the respective perforations 32.

Ordinarily, in accordance with my invention, it is desirable that the hereinbefore described lamp housing be enclosed by a protective casing to prevent unintentional contact with the heated parts. If desired, such protective casing may be constituted by a cage 33 formed from open mesh wire netting, said cage, preferably being suitably secured, as by ears 34, to the rear surfaces of the side walls of housing 28, Fig. 7. As shown in Figs. 3 and 4, the cage 33, preferably, is of a height corresponding with the combined height of the housings 2 and 28 and, ordinarily, is generally rectangular in configuration. Since the cage 33 is securely fastened to the upper housing 28, it results that the two are movable together as a unit, the cage usually being held by the fingers of one hand when moving, detaching or attaching the housing 28 to the housing 2.

At the side of the lens L removed from the lamp 17, the base 1 carries a standard 35, a pin 36 adjustable in an elongated slot holding the standard 35 in a desired position on said base. Suitably secured to the standard 35 is a sleeve 37 within which an objective lens L3 is frictionally received, the axis of said lens L3 extending vertically in the example shown in Figs. 1, 3 and 4.

As hereinafter pointed out, the projecting beam of light passes horizontally through the lens L from right to left, Fig. 4, and by a prism 38 or other suitable light-reflecting member, is deflected so as to pass upwardly through the lens L3. As herein shown, the prism 38 is carried by a member 39 secured to the standard 35 by a screw 40 which extends through an elongated slot whereby the prism 38 may be retained in a desired adjusted position with respect to said standard 35.

In accordance with the form of my invention herein described, the aforesaid tape T is "ticker" tape of the character which issues from stock "ticker" mechanism herein generally shown at P and which may be of any character suitable for printing thereon information concerning stock quotations. As well, however, the tape T may be any other tape or web and particularly, if desired, it may be such as issues from typewriter printing mechanism having individual keys.

As shown in Fig. 1 but not necessarily, the tape T with the printed characters on its upper face passes from left to right, Fig. 1, and then is turned so as to move at right angles with respect to its first course whereby any given point thereon passes lengthwise of the aperture 2b which is the projection or "picture" aperture. The tape T, in any suitable manner, is drawn in a horizontal direction through the projection field, at which time it is disposed edgewise, i. e., perpendicular to the plane of the sheet showing Fig. 1.

The mechanism for thus drawing or pulling the tape T through the projection field is herein shown as comprising a motor M mounted upon an extension 1a of the base 1, said motor M carrying a laterally extending gear housing 41 into which the shaft of the motor armature extends. Interiorly of said gear housing 41, said last named shaft terminates in a worm gear 42 which meshes with and drives a worm wheel 43 at such slower speed as is suitable for tape-pulling purposes.

As illustrated herein, but not necessarily, the worm wheel 43 carries a vertical shaft which extends both above and below the gear housing 41. Above the latter, said last named shaft carries a roller 44 with which coacts an idler roller 45 mounted on an arm 46 pivoted to the gear housing 41, said roller 45 and arm 46 being suitably biased in a clockwise direction, Fig. 1, as by a spring 47 connected to said arm 46 and to the gear housing 41.

If desired, the tape T may be rewound upon a reel 48 after being drawn through the projection field. If so, there may be utilized a bracket arm 49 which is disposed at an acute angle with respect to the adjacent side wall of the lens housing 2 and is suitably secured thereto, as by a plurality of screws 50. Adjacent its otherwise free end, the bracket arm 49 has a shaft 51 rotatably journaled therein, said shaft, at its upper end, carrying the reel 48, Fig. 2. At its lower end, the shaft 51 carries a pulley 52 around which and a similar pulley 53 is disposed an endless spring belt 54, or the like.

It is well understood in the art that character-bearing tape issues from ticker mechanism at an irregular or non-uniform rate. Where such conditions obtain, it becomes necessary to vary the speed of the tape-drawing motor M more or less in accordance with the varying rate at which the tape comes from the ticker T. The speed of the motor M may thus be controlled in any suitable manner such, for example, as disclosed in my pending application, Serial No. 441,963, filed April 5, 1930, wherein a twisted tape loop is described as formed between the ticker mechanism P and the entrance to the projection field, said twisted tape loop, to more or less exent depending upon the speed of operation of the ticker mechanism, covering or uncovering a passage opening into a vacuum chamber to thereby vary the speed of the motor M.

As herein generally shown, the aforesaid vacuum chamber is constituted by a housing 55, Figs. 1, 3 and 9, having a passage 56 which is more or less opened by the twisted tape loop.

Communicating with the housing 55 is a conduit 57 which, in accordance with my invention, extends to a chamber 58 formed in an extension 1b of the base 1, Fig. 5, said chamber 58 being covered by a plate 59, secured to said last named base extension by a plurality of bolts 60, Figs. 1 and 5. Disposed interiorly of the chamber 58 is an exhaust fan rotor 61 rotated by the armature shaft 62 of a suitable electric motor M1 suitably secured, preferably but not necessarily, in upstanding relation, upon the plate 59.

The motor M1 is adapted for continuous operation and draws air from within the housing 55 through the conduit 57, the air entering the chamber 58 and passing to the atmosphere in any suitable manner, for example, through the space between the peripheral lower surface of the plate 59 and the adjacent surface of base extension 1a, such space intentionally existing in the example shown because suitable spacing members, not shown, are disposed between the aforesaid plate and base surfaces prior to bolting-down of the plate 59.

The aforesaid housing 55 is carried by a web-like standard 63, the lower flanged surface of which is secured by screws 64, or equivalent, in upstanding relation on the base 1, Fig. 9. As described more particularly in my aforesaid pending application, Serial No. 441,963, the standard 63 carries a casing 65 open at its bottom and in which a plunger 66 is freely reciprocatory. The space in the casing 65 above the plunger 66 is connected with the housing 55 by a passage, not shown, so that closure or substantial closure of the passage 56 by the twisted tape section causes the development of a partial vacuum in the casing 65 whereby the plunger 66 moves upwardly. This partial vacuum is produced because the hereinbefore described fan rotor 61 constantly tends to withdraw air from the housing 55 through the conduit 57 and, when the passage 56 is closed as stated, the casing 65, obviously, is placed under partial vacuum conditions. This condition obtains when the twisted tape loop is unduly large, at which time the motor M should be operating to draw the tape through the projection field.

Conversely, when the twisted tape loop becomes of such small size or configuration that the passage 56 is largely or substantially opened, the pressure within the casing 65 becomes substantially that of the atmosphere whereupon the plunger 66 descends. With such condition of the twisted tape loop, the motor M should be non-operative or should be operating so slowly that movement of the tape through the projection field has been entirely or almost entirely discontinued.

Accordingly, with the form of my invention herein disclosed, the position of the plunger 66 controls the speed of operation of motor M and the mechanism utilizable for this purpose may be of any suitable character. It may be, for example, of the character disclosed in my aforesaid pending application Serial No. 441,963, although there is shown in this particular instance multi-contact mechanism of the character described and claimed in my pending application Serial No. 439,570, filed March 28, 1930. As more particularly described in said last named application, the control mechanism thus utilized comprises a plurality of switch contact members 67 together with a resistance structure 68 and, as shown in Fig. 9, these parts may be secured to the standard 63 below a lateral shelf or ledge 63a of said standard. When thus arranged, it is desirable that the shelf 63a have a housing-forming member 69 suitably secured thereto, as by screws 70, or the like.

Preferably, but not necessarily, the circuit of the motor M comprises conductors 71, Fig. 1, which lead to a connecting plug 72 detachably related to a conductor-carrying receptacle 73 carried by the base 1 and of a character well understood in the art. Similarly, the switch contact members 67 and resistance structure 68 may have conductors 74 leading therefrom, said conductors 74 leading to a plug 75 detachably related to a base-carried receptacle 76. Beneath the base 1, the conductors of the receptacles 73 and 76 are suitably connected to obtain the above described operation of the motor M. Further, if desired, the motor M1 may have conductors 77 leading therefrom to a plug 78 and receptacle 79, the conductors of the latter leading to any suitable source of current, not shown.

To place the hereindescribed mechanism in condition for operation, a length of the tape T is unwound from the reel of the printing mechanism P. Adjacent the printing wheel of the latter the tape is caused to take twisted loop formation as shown in Fig. 1, for example, and as more clearly described in my aforesaid pending application, Serial No. 441,963, the vertical edgewise tape section at the entrance to the projection field being suitably held in readily slidable engagement with the rounded nose of the housing 55, or equivalent. The mechanism for performing this function may be of any suitable character and, for example, may be as shown particularly in Figs. 1, 2 and 9, wherein a bar 80 is freely pivoted to a member 81 extending laterally from the standard 63. Projecting from the bar 80 and carried thereby is an elongated member 82 terminating in a knob 82a and having a nose 82b coactable with the mid-section of the tape T to hold the same against the nose of housing 55. As shown in Fig. 3, the weight of the bar 80 is eccentric with respect to the pivot 81 and, therefore, the nose 82b tends to move in a clockwise direction, Fig. 3, to the extent permitted by the housing 55. Obviously, the bar 80 may readily be swung in reverse direction when the tape is to be readjusted or when a rethreading operation becomes necessary.

After the tape has thus been disposed in vertical edgewise relation at the entrance to the projection field, an advanced tape section is similarly disposed between the rollers 44 and 45, a still further advanced tape section being wound upon the reel 48.

When thus arranged, the hereindescribed mechanism is in condition for operation which is as follows:

The lamp 17 is energized by any suitable source of current, the light emanating therefrom and from the reflecting member 18 traversing the condensing lenses L1 and L, and then passing through the projection aperture 2b and the tape section defined or framed thereby. Thereafter, the light beam is deflected upwardly by the reflecting member 38 and, after traversing the objective lens L3, passes by way of any suitable light-reflecting system to a suitable screen which, ordinarily, is of the character utilized in "rear" projection or projection of that character wherein the light beam traverses the screen to come to the eyes of the audience. The motor M1 is also placed in operation and tends to continuously draw air through the conduit 57 from the housing 55.

Assuming that the passage 56 is uncovered, operation of the ticker mechanism P causes the development of a larger and larger loop until said passage is covered sufficiently to cause the development of a partial vacuum in the housing 55 and casing 65 whereupon the plunger 66 rises to close the circuit through the motor M or to substantially increase the speed of operation thereof. When this happens, the roller 44 rotates counter-clockwise, Fig. 1, whereby, due to the driving relation of the rollers 44 and 45, the tape T is drawn through the projection field and thereafter wound upon the reel 48 due to the fact that the latter is rotated by the belt 54. Action of the motor M thus continues while the passage 56 remains closed or substantially closed. However, when operation of the ticker mechanism P is temporarily discontinued in the customary manner, the passage 56 will probably be uncovered whereupon the pressure conditions within the housing 55 and chamber 65 are restored approximately to atmospheric value, the plunger 66 descending and operation of the motor M being discontinued or substantially so. Soon thereafter in the usual manner, operation of the ticker mechanism P is initiated to again cover the passage 56 and cause renewed operation of the motor M, the cycle of operations thus continuing during operation of the mechanism.

The advantages of an arrangement constructed in accordance with my invention are numerous and of importance.

In the first place, simplicity is the keynote, the number of parts having been greatly reduced in comparison with prior devices constructed for a similar purpose.

The cage 33 and housing 28 are readily removable or swingable to a position permitting access to the condenser lenses and the lamp housing, the latter being removable in a simple manner to permit inspection or replacement of the lamp. Similarly, the lenses L and L1 are readily removable under the conditions just noted. The lamp housing is ventilated in an efficient manner since air passes readily thereinto from the bottom, rises as a convection current and escapes to the atmosphere through the passage beneath the plate.

The base and plate construction whereby the chamber 28 is formed constitutes an important feature of my invention because contributing to the simplicity and the decreased expense compared with prior art arrangements.

As shown in Figs. 1, 4 and 7, it is desirable that the walls of the housings 2 and 28 be provided with apertures or slots 83 utilizable for ventilating purposes and for the dissemination of heat produced interiorly thereof. As shown particularly in Fig. 1, the slots 83 in the housing 28 are formed in the inclined face thereof and, to prevent the direct passage of light from the interior of the housing 28, it is desirable that there be provided a plate 84 spaced below said lower housing face and suitably secured thereto, Fig. 5; if desired, a similar baffle plate arrangement may be provided for the slots 83 in the housing 2.

Disposal of the ticker mechanism P as shown in Fig. 1 is highly advantageous since said ticker mechanism normally rests within a corner cut into the base 1. When thus arranged all of the parts are grouped in a preferred manner with respect to each other so that the space requirements are reduced to a minimum. It shall be understood, however, that, under some circumstances, the base 1 may extend beneath the mechanism P, the latter, however and preferably, being disposed at one side of the chamber 58 and also at one side of the objective lens L3 or, as hereinafter described, at one side of the lamp and condenser lens housings.

Referring particularly to Figs. 10 and 11, there is illustrated a preferred arrangement for supporting the ticker mechanism P, or equivalent. As shown, a bracket or supporting arm 85 projects from the base 1 in the general plane thereof and is secured thereto in any suitable manner, as by screws 86. A set of spaced members upstand from the bracket 85 and from a lateral arm 85a thereof. In each set of said members, a roller 87 is journalled for free rotative movement. The aforesaid bracket 85 terminates in an upstanding pin 88 on which the hub 89 of a table 90 is freely rotatable, said table 90 comprising an arc-shaped track 91 which rides on the aforesaid rollers 87.

As shown in Fig. 10, the table 90 is generally square or rectangular and at each corner thereof may comprise a shallow, cup-shaped member 92, each receiving a depending pin 93, all of the latter projecting downwardly from the base of the ticker mechanism P, or equivalent, Fig. 11. Suitable stop mechanism may be provided for limiting rotative movement of the table 90 and the thereby-carried ticker mechanism P. As shown, a stop member 94 depends from the table 90 and coacts with a roller 87 to prevent further rotative movement of the table 90 in a counter-clockwise direction, Fig. 10, this being the normal, operative position of the ticker mechanism P. When it becomes necessary to service the latter or to supply a new roll of tape thereto, the ticker mechanism casing may be manually actuated to move it and the table 90 in a clockwise direction, Fig. 10, to a desired extent. Thereafter, in as simple a manner, the parts may readily be returned to the position shown or until the stop member 94 again coacts with that roller 87 directly in its path.

With the form of my invention illustrated in Figs. 1–11 inclusive, the tape T passes from the ticker mechanism P, or equivalent, flatwise and in a horizontal direction with the ink which forms the characters on the upper surface thereof. While passing through the projection field, the tape still travels horizontally but is disposed edgewise in a vertical direction. At this time, the characters are in normal, upright position and the ink which forms the characters is on the side of the tape removed from the lamp 17. With such an arrangement, there may be utilized a projecting mirror system of the type shown in Fig. 17 wherein the light beam after traversing the objective lens L3 coacts with a mirror or other light-reflecting surface 95 by which said light is deflected so as to pass in a horizontal direction and come into coaction with a screen 96 along which images of the tape characters move horizontally and in vertical upright position in correspondence with the tape movement.

In accordance with an important phase of my invention, highly satisfactory and efficient light-reflecting systems may be utilized to obtain plural images of the tape characters in the event that said tape moves as described above and the light beam passes therethrough in a direction the reverse of that heretofore described. With such an arrangement, the light beam, after passage through the tape, may be separated into two distinct beams, each of which coacts with separate mirror systems and a separate screen to produce duplicate sets of images, the duplicate images of each character being simultaneously produced on the respective screens.

Any suitable arrangement may be utilized for thus passing the projecting light beam through the tape to produce the duplicate images described above. However, it is desirable that a structural arrangement of the character heretofore described be utilized because, by so doing, the same parts or parts formed from the same pattern are utilizable either for single image or double image projection and, obviously, any twofold use to which parts may be put is highly advantageous.

Accordingly, as shown particularly in Figs. 12-16 inclusive, I have illustrated the same base 1 as heretofore described, the base 1 having the ticker mechanism P associated therewith the same as described above. At one side of the ticker mechanism, the base 1 has the same chamber 58 together with its overlying cover 59 which carries the motor M1. At its other side, the base 1 carries the motor M, the same as heretofore described. Further, the standard 63 together with all parts carried thereby are positioned the same in Figs. 12-16 as in Figs. 1-11.

A comparison of Figs. 1 and 12 shows in Fig. 1 that the condenser lens and lamp housings are at the side of the tape T to the right and that the objective lens L3 is at the side of said tape to the left whereas in Fig. 12, the relation of these respective parts as regards the tape T are reversed. In other words, Fig. 12 shows the condenser lens and lamp housing at the side of the tape T to the left so that with the arrangement of Fig. 12 the projecting light beam passes through the tape T in a direction the reverse of that shown in Fig. 1 although, in both cases, the tape moves with the same side facing in a given direction. In other words, the inked side of the tape T now faces the projecting lamp and, by the same token, faces the lens L. For this reason, the ribs 2e are provided, the inked characters passing therebetween and, accordingly, no blurring action occurs even though the ink is still wet or moist.

Preferably, in accordance with my invention, the condenser lens and lamp housings of Figs. 12-16 are the same as those shown in Figs. 1-11 with the exception, if desired, that the lamp socket of Figs. 12-16 may be supported by a member disposed below the general plane of the base 1 but secured thereto, the lamp extending upwardly through a suitable opening formed in said base 1 and being, if desired, of higher rating than the lamp of Figs. 1-11. It shall be understood, however, that the condenser lens and lamp housing arrangement of Figs. 12-16 may depart in such respects as may be desired from the corresponding construction heretofore described.

In the form of my invention shown in Figs. 12-16, the projecting light beam, after passing through the tape section framed by the aperture 2b and while still traveling horizontally or substantially so, traverses the objective lens L3 which may be carried by a standard 97 suitably secured to the base 1, as by a screw 98 adjustable in an elongated slot formed in the base.

After passing through the objective lens L3, the projecting light beam may be separated into two distinct beams by any suitable arrangement such, for example, as herein disclosed by utilization of crossed mirrors 99 and 100. These mirrors may be of any suitable character but preferably they are as herein shown and arranged, respectively, at angles of 135 degrees with respect to the longitudinal axis of the objective lens. As herein illustrated, the section 100a of mirror 100 faces the lower half of the lens L3 and the section 99a of mirror 99 faces the upper half of said lens L3. Beyond the sections 99a and 100a, the respective mirrors, if desired but not necessarily, may be of full height substantially in correspondence with or greater than the diameter of the lens L3.

In the relation just specified, the mirrors 99 and 100 may be supported in any suitable manner. As shown, the mirror 99 is slidable sidewise into a frame 101 having holding lugs thereon as shown in Fig. 14 and the mirror 100 may be slidable lengthwise into a frame 102 having a holding lugs thereon as shown in Fig. 13. Preferably, the frame 102, at the entrance end thereof, has a spring clip 103 movable sidewise to permit passage of the mirror 100 into the frame 102 whereupon said clip 103 returns to the position shown in Fig. 13 to detachably retain the mirror 100 to the frame 102.

Frames 101 and 102, in proper crossed relation, may be secured to an angular bracket or member 104, Fig. 12 in any suitable manner, said bracket 104 being the upper section of a standard carried by and upstanding from the base 1, the flanged lower surface of said standard being suitably secured to said base 1, as by a screw 105, Fig. 16, said flanged lower surface, preferably, comprising an elongated slot whereby the standard and the parts carried thereby may be adjusted toward or from the lens L3.

With the arrangement shown and with the frames 101 and 102 secured to the bracket 104 as stated, the mirror 100 may readily be inserted endwise into the frame 102 as described above; thereafter, the mirror 99 may be inserted sidewise into its frame 101. Such an arrangement is advantageous because permitting ready removal of the mirrors from their respective supporting frames, such removal being necessary, for example, for replacement or cleaning purposes.

In accordance with one form of my invention, the aforesaid mirrors 99 and 100 separate the projecting light beam into separate and distinct beams, each of which, by a suitable light-reflecting system, is brought into coaction with a suitable screen. As shown herein, mirrors 106 and 107, or other suitable light-reflecting surfaces, are provided for initial engagement by the respective light beams after they leave the mirrors 99 and 100, said mirrors 106 and 107 being carried, preferably, in detachable sidewise relation by the respective frames 108 and 109 forming the top sections, respectively, of standards, the respective lower flanged sections 108a and 109a of which are suitably secured, for example, to the base 1 by screws 110, or equivalent, the flanged sections 108a and 109a preferably being provided with elongated slots through which the respective screws 110 extend whereby the mirrors 106 and 107 are readily adjustable either toward or from the respective mirrors 99 and 100.

As shown particularly in Fig. 18, the mirrors 106 and 107 may be disposed so as to pass the respective light beams upwardly and in crossing relation, the light beam from the mirror 106 coacting with a mirror 111 and then with a suitable screen 112, and the light beam from the mirror 107 coacting with a suitable mirror 113 and then with a suitable screen 114, said screens 112 and 114, usually, being of a character adapted for "rear" projection.

Preferably, the light-reflecting systems shown in Fig. 18 are duplicate in character and symmetrically disposed, the screens 112 and 114 being arranged more or less in back-to-back relation and parallel with respect to each other, the tape T passing in a direction generally at right angles with respect to the planes of said screens 112 and 114.

With said tape T arranged in the projection field as heretofore described, the disclosed mirror systems cause the simultaneous production of duplicate images of each tape character. These images travel horizontally in vertical, upright relation and pass in opposite directions from end to end of the respective screens 112 and 114, said images being readable from the front of each screen, the "front" being, in the example shown, that side of the screen on the side opposite the last reflecting mirror, either 111 or 113, as the case may be.

Referring to Fig. 12, it will be noted that the bracket arm 49 is carried by the lens housing 2. If this is to be the same bracket arm which is shown in Fig. 1, then it follows that in Fig. 12 it is positioned "upside-down" with respect to the position thereof in Fig. 1. For this condition to exist, the shaft 51 should have symmetrically extending ends so that either the reel 48 or pulley 52 may be secured to the same end thereof, the upper shaft end carrying the reel 48 in Fig. 1 and the same shaft end being lowermost and carrying the pulley 52 in Fig. 12. Further, since in both Fig. 1 and Fig. 12, the bracket 49 is secured to the lens housing 2, it follows that opposite side walls of said housing shoud be tapped for the reception of the screws 50. This follows because the "upper" side wall of lens housing 2 as shown in Fig. 1 is the "lower" wall as shown in Fig. 12 and vice versa. It shall be understood, however, that the bracket arm 49, or equivalent, may be supported otherwise than by the housing 2 and that it need not be of the universal character described.

Since the reel 48 is positioned to the right in Fig. 1 and to the left in Fig. 12, it follows that the tape T will be arranged differently on the rollers 44 and 45 in the two instances and, therefore, the direction of rotation of motor M with the arrangement of Fig. 12 is the reverse of that with the arrangement of Fig. 1. This condition may be met by selecting a reversible type of motor. However, if desired, the arrangement may be such that the motor M is not of the reversible type but is simply clamped in position in accordance with the particular system which is being utilized. Further, it shall be understood that the base extension 1a may be omitted if desired in which case, the motor M may be supported in any suitable manner in its various positions as, for example, on an independent support adapted to be secured to the base 1 in proper positions.

The standard 63 may be secured to the lens housing 2 instead of to the base 1 with the arrangement of Fig. 1, if desired in which case, a separate standard may be utilized with the arrangement of Fig. 12, said last named standard differing in a detailed manner from the first named standard and being adapted for attachment to the base 1.

The base 1 may be a casting and, by the casting operation, lugs or projections may be formed on the lower surface thereof so that it may be drilled to provide the necessary base apertures either for single or double image projection; that is, the base 1 may be drilled so as to receive the apparatus related substantially as shown in Fig. 1 or as in Fig. 12.

It shall be understood that my invention is not to be limited to projecting apparatus adapted for alternate single or double image projection as described above, although it is desirable under some circumstances that the arrangement shall be such that there may be alternate use if desired, or that the base 1 is of such character that either type of projection may be utilized as desired. However, under some circumstances, it may be desirable to provide a base adapted only for single image or double image projection as the case may be.

Although my invention has been described in connection with a particular type of system for controlling movement of a tape through the projection field, it shall be understood that, from its broad aspects, the invention is not to be limited to the control system herein disclosed and, particularly, the invention is not to be limited to control of the tape pulling motor by a twisted tape section.

Ordinarily, the cage 33, due particularly to the construction thereof, remains at such low temperature during operation of the projection apparatus that it and the housing 28 may readily be handled. If desired, said cage 33 may be detachably formed with respect to the housing 28 and further, if desired, the housing 28, cage 33 and lamp housing 24 may be suitably secured together for movement together as a unit in which case, the pins 29, preferably, would be omitted so that the combined structure could be removed from the other apparatus by a simple elevating action.

Although I have described my invention in connection with "through" projection, i. e., projection of that character wherein the projecting light beam passes through a more or less transparent tape section bearing the image-producing characters, it shall be understood that, from some aspects, my invention is applicable as well to projection of the "reflecting" type, i. e., projection of that character wherein the light beam is reflected by a more or less non-transparent tape section.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system, a base, projection apparatus carried thereby, and means for controlling the movement of a character-bearing tape through the projection field of said apparatus, said means comprising a chamber in which the air pressure is controlled by the position of said tape, and mechanism for withdrawing air from said chamber, said mechanism comprising a second chamber having a part at least of its wall structure formed by an integral part of said base.

2. In a projection system, a base, projection apparatus carried thereby, and means for controlling the movement of a character-bearing tape through the projection field of said apparatus, said means comprising a chamber in which the air pressure is controlled by the position of said tape, mechanism for withdrawing air from said chamber, said mechanism comprising a second chamber formed in part by a depression in said base, and a plate covering said second chamber and secured to said base.

3. In a projection system, a base, projection apparatus carried thereby, means for controlling the movement of a character-bearing tape through the projection field of said apparatus, said means comprising a chamber in which the air pressure is controlled by the position of said tape, and mechanism for withdrawing air from said chamber, said mechanism comprising a second chamber formed in part by a depression in said base, a plate covering said second chamber and secured to said base, a fan rotor in said second chamber, and a motor carried by said plate for operating said fan rotor.

4. Apparatus for projecting images from a character-bearing tape, said apparatus comprising lens housing structure, said structure comprising separate housings movably related to each other, means on one of said housings forming a path for the passage of said tape, and a lens disposed in part in each of said housings.

KENNETH L. CURTIS.

CERTIFICATE OF CORRECTION.

Patent No. 1,982,201.

November 27, 1934.

KENNETH L. CURTIS.

It is hereby certified that error appears in the printed specification of the above numbered patent requiring correction as follows: Page 6, line 109, strike out the article "a" second occurrence; page 8, line 16, claim 2, before "mechanism" insert the word and; and that the said Letters Patent should be read with these corrections therein that the same may conform to the record of the case in the Patent Office.

Signed and sealed this 5th day of March, A. D. 1935.

Leslie Frazer (Seal)

Acting Commissioner of Patents.

trolling the movement of a character-bearing tape through the projection field of said apparatus, said means comprising a chamber in which the air pressure is controlled by the position of said tape, and mechanism for withdrawing air from said chamber, said mechanism comprising a second chamber having a part at least of its wall structure formed by an integral part of said base.

2. In a projection system, a base, projection apparatus carried thereby, and means for controlling the movement of a character-bearing tape through the projection field of said apparatus, said means comprising a chamber in which the air pressure is controlled by the position of said tape, mechanism for withdrawing air from said chamber, said mechanism comprising a second chamber formed in part by a depression in said base, and a plate covering said second chamber and secured to said base.

3. In a projection system, a base, projection apparatus carried thereby, means for controlling the movement of a character-bearing tape through the projection field of said apparatus, said means comprising a chamber in which the air pressure is controlled by the position of said tape, and mechanism for withdrawing air from said chamber, said mechanism comprising a second chamber formed in part by a depression in said base, a plate covering said second chamber and secured to said base, a fan rotor in said second chamber, and a motor carried by said plate for operating said fan rotor.

4. Apparatus for projecting images from a character-bearing tape, said apparatus comprising lens housing structure, said structure comprising separate housings movably related to each other, means on one of said housings forming a path for the passage of said tape, and a lens disposed in part in each of said housings.

KENNETH L. CURTIS.

CERTIFICATE OF CORRECTION.

Patent No. 1,982,201.

November 27, 1934.

KENNETH L. CURTIS.

It is hereby certified that error appears in the printed specification of the above numbered patent requiring correction as follows: Page 6, line 109, strike out the article "a" second occurrence; page 8, line 16, claim 2, before "mechanism" insert the word and; and that the said Letters Patent should be read with these corrections therein that the same may conform to the record of the case in the Patent Office.

Signed and sealed this 5th day of March, A. D. 1935.

(Seal)

Leslie Frazer
Acting Commissioner of Patents.